United States Patent [19]

Hindman et al.

[11] Patent Number: 4,482,461

[45] Date of Patent: Nov. 13, 1984

[54] BACKWASH CONTROL FOR CONSTANT VOLUME-PRESSURE FILTRATION SYSTEM

[75] Inventors: David B. Hindman, Rochester; Norman E. Wood, Pittsford; David N. Foster, Rochester; D. Stephans Damtoft, Jr.; James S. Paduchowski, both of Rochester, all of N.Y.

[73] Assignee: French Systems, Inc., Rochester, N.Y.

[21] Appl. No.: 451,086

[22] Filed: Dec. 20, 1982

[51] Int. Cl.³ .................... B01D 23/24; B01D 37/00
[52] U.S. Cl. .................. 210/741; 210/791; 210/108; 210/143
[58] Field of Search ............... 210/739, 741, 791, 797, 210/798, 138, 106, 107, 108, 111, 141, 142, 334, 341, 332, 333.1, 333.01, 143; 55/96, 213, 272, 283

[56] References Cited

U.S. PATENT DOCUMENTS

| | | |
|---|---|---|
| 3,452,586 | 7/1969 | Childs et al. ............ 210/106 |
| 3,957,637 | 5/1976 | Morey .................. 210/741 |
| 4,059,518 | 11/1977 | Rishel .................. 210/107 |
| 4,107,037 | 8/1978 | Cavanaugh et al. ........ 210/791 |
| 4,187,175 | 2/1980 | Roberts et al. .......... 210/108 |
| 4,277,255 | 7/1981 | Apelgren ................ 55/283 |

FOREIGN PATENT DOCUMENTS 39228  3/1980  Japan .................... 210/108

Primary Examiner—Richard V. Fisher
Assistant Examiner—John W. Czaja
Attorney, Agent, or Firm—Shlesinger, Fitzsimmons & Shlesinger

[57] ABSTRACT

In a system having a fluid filter that is automatically backwashed each time the differential pressure thereacross reaches a predetermined value, the desired base rate at which the drop across the filter should increase during its initial filtering sequence (i.e., before backwash) is determined and stored in digital format in a process controller along with a preset maximum differential pressure at which backwash is set to occur. During use of the filter the actual rate of change of the pressure drop thereacross is monitored continuously and compared with the rate that is stored in the controller. Whenever the actual rate of change of the pressure drop across the filter differs from the base rate, which is the usual case, the present backwashing pressure is automatically adjusted—usually downwardly. This reduction continues until the actual drop across the filter finally reaches the adjusted value of the preset backwashing pressure, at which time backwashing of the filter is automatically commenced. In a preferred embodiment, the adjustment is based upon the time differential at a given instant between the actual filter time and the desired or base curve time, and the difference is used to reduce the preset pressure in accordance with the inverse of the base curve rate. In another embodiment the difference between the actual differential pressure across a filter and the desired differential pressure at any instant is determined and subtracted from the preset backwashing pressure.

20 Claims, 7 Drawing Figures

BACKWASH CONTROL FOR CONSTANT VOLUME-PRESSURE FILTRATION SYSTEM

BACKGROUND OF THE INVENTION

This invention relates to filter systems, and more particularly to improved means for controlling the backwash in filtration systems of the type described more nearly to maintain constant as nearly as possible the pressure of the fluid flowing in the system.

Regardless of the exact construction of a given filter element, the fact remains that the debris which it removes from the fluid that is being filtered progressively builds up on, or in, the pores or filter openings in the element, thereby causing more and more of these openings to become closed off. As a consequence the resistance to the flow of fluid through the filter increases, and as a corollary the volume of the fluid flowing through the filter usually decreases. This creates a problem, because as a general rule it is most desirable to maintain a constant flow or volume of properly filtered fluid through a system.

A variety of solutions have been proposed to obviate this problem. Among the most fundamental is the use of self-cleaning filters, which are intermittently backwashed to remove accumulated solids or debris which impede the flow of fluids through the filter. This process, of course, requires periodic removal of the respective filter elements from the system in order to permit them to be backwashed or cleaned, before being returned to operation in the system. (See, for example, U.S. Pat. Nos. 2,366,903 and 2,828,862.) As a supplement to this method, it is customary also to employ a plurality of different filters, certain of which are being backwashed while others are being utilized in the system, thus minimizing the shut-down time of the system.

As disclosed for example in U.S. Pat. No. 3,172,846, it has been customary with prior such backwash operations automatically to initiate backwashing whenever the resistance to fluid flow through the filter reaches a certain, predetermined setpoint. Typically this is done by monitoring the pressure drop across the filter—i.e., the pressure differential between the inlet and outlet of the filter—and initiating backwash when this differential reaches a predetermined set value. After being cleaned the filter is reintroduced into the system where it remains in operation until the set or predetermined pressure differential across the filter has once again been reached, at which time the backwashing operation once again commences automatically.

One of the major disadvantages of backwash operations of the type described is that, as a matter of fact, each backwash or backflush cycle does not completely clean the associated filter element, so that over a prolonged period of use the filter element eventually becomes completely clogged or useless.

For example, assuming that a fluid, such as a coolant, is pumped through a multiple tube pressure filter at a gauge pressure of 50 p.s.i. when the tubes are new and perfectly clean; and assuming that the tubes are set to be backwashed automatically when the pressure differential across the filter reaches 10 p.s.i. (i.e., 50 p.s.i. on the outsides of the tubes and 40 p.s.i on the inside), then when the tubes are backflushed to atmosphere, the pressure at the insides of the tubes (40 p.s.i.) will be four times greater than the 10 p.s.i. differential which triggered the backwash. Each time that the backwash occurs some additional debris remains on the filter tubes, so that when they are next reinserted into the system for filtering purposes the initial or starting differential pressure will be higher than at the start of the preceding filtering sequence. In other words, after filtering and backwashing the tubes cannot be returned to their original state of cleanliness. Obviously, therefore, each time the tubes are backwashed and reintroduced into the system, the system will start out with a higher, residual differential pressure across its filter tubes, and as a consequence its backwash operation will be triggered that much sooner. In any case, whenever the backwash occurs the ratio of the backflush pressure (40 p.s.i.) to the preset differential pressure (10 p.s.i.) will be at the constant ratio of 4 to 1.

Still another disadvantage of such prior backwash systems is that, for the most part, as the pressure differential slowly builds up to the preset triggering value (for instance 10 p.s.i.) between each backwash cycle, there is a corresponding drop in the downstream pressure and volume of the fluid flowing through the system. As a consequence there is an intermittent and undesirable rising and falling in the overall volume and pressure of the fluid flowing in the system.

While it has been suggested that the interval of time between backwashes diminishes successively with each additional backwashing operation, this presupposes that the fluid being filtered remains relatively consistent as far as the nature and content of the impurities that are being removed from the fluid by the filter. In practice, however, the consistency of the fluid being filtered may well vary rather widely, in which case the intervals of time between successive backwashes may differ considerably, depending for example upon the quantity of impurities or debris contained in the fluid during any given filtering sequence.

It is an object of this invention, therefore, to provide an improved method for controlling the backwash of filters thereby better to stabilize the pressure of fluid flowing in filtration systems of the type described herein.

Still another object of this invention is to provide for systems of the type described improved control means of which operates automatically to vary the set point or differential pressure at which a backwash operation occurs, depending upon the rate at which the associated filter becomes clogged.

A further object of this invention is to provide for a system of the type described, a method of comparing the rate of clogging of the associated filter unit with an established base rate or curve, which is representative of the filter in its new or perfectly clean state, and automatically adjusting the value of the preset backwash pressure either up or down in proportion to the difference between the actual rate of clogging and the indicated base rate.

A more specific object of this invention is to provide a method of the type described which effects reduction in the preset value of the backwash in amounts which are inversely proportional to the rate of change in the differential filter pressure indicated by the base curve.

SUMMARY OF THE INVENTION

In an illustrated embodiment, and merely by way of example, the control system is designed to be employed in conjunction with a multiple tube pressure filter of the type in which the tubes are backwashed each time the pressure differential across the unit exceeds a preset value. When all tubes have been backwashed the backwash cycle is complete; and the normal filtering sequence continues until the differential pressure across the filter (as represented by all of the tubes) once again reaches the set point or preset value.

For comparison purposes an ideal or empirically determined pressure differential vs. time curve (base curve) is established and stored in a digital format in a process controller. The pressure differential across the filter during each succeeding filtering sequence (i.e., the filtering interval between each backwash) is monitored and converted from an analog to a digital signal and is constantly compared with increments of pressure of the base curve stored in the controller. If a comparison indicates that the filter tubes are becoming clogged at a greater rate than represented by the base curve, then the differential pressure set point for initiating backwash is automatically reduced, say for example from 10 p.s.i. to 5 p.s.i. This means that as soon as the differential pressure across the filter reaches 5 p.s.i. the backwash operation will be triggered rather than waiting for the pressure to reach the original (base curve) set value of 10 p.s.i. This adjustment of the set point for the differential pressure occurs periodically depending upon the signals derived from comparisons of the filter sequence curves with the base curve.

There are two basic ways of effecting a comparison of the base curve data with the rate of change of differential pressure across a filter unit during each filtering sequence. In one embodiment of the invention this is effected by continuously comparing during each filtering sequence, and in a digital format, the actual differential pressure across the filter unit with the desired or base differential pressure, while at the same time comparing the running or operating time of the filter unit with the base curve times that should be required to reach successive pressure differentials- e.g., 1 psi., 2 psi., 3 psi., etc. Whenever for a given interval the actual differential pressure exceeds the then indicated base curve differential pressure, the difference in these two values is subtracted from the preset or backwash-triggering pressure to adjust its value. The actual differential pressure is also compared continuously with this triggering pressure and automatically initiates backwash when it equals or exceeds the adjusted preset pressure.

In a second preferred embodiment of the invention the actual differential pressure is compared with successive, equal increments of the base curve pressure (e.g., 1 psi., 2 psi., etc.), and whenever the actual differential pressure equals or exceeds the incremental pressure, the actual sequence time for reaching such pressure is substracted from the base time it should have taken, and the difference is substracted from the overall base time it should take to reach the maximum preset differential pressure as indicated by the base curve. The result, which is referred to hereinafter as the target time, is then used to adjust the preset or triggering pressure to a value indicated by the point where the target time intersects the base curve. The advantage of this second emobdiment is that compensation or adjustment of preset differential pressure in response to filter clogging is initiated in inverse proportion to the base rate curve, thus reducing the preset pressure value quite substantially in the early stages of a sequence.

THE DRAWINGS

DETAILED DESCRIPTION OF THE PREFERRED EMBODIMENTS

Figure 1:
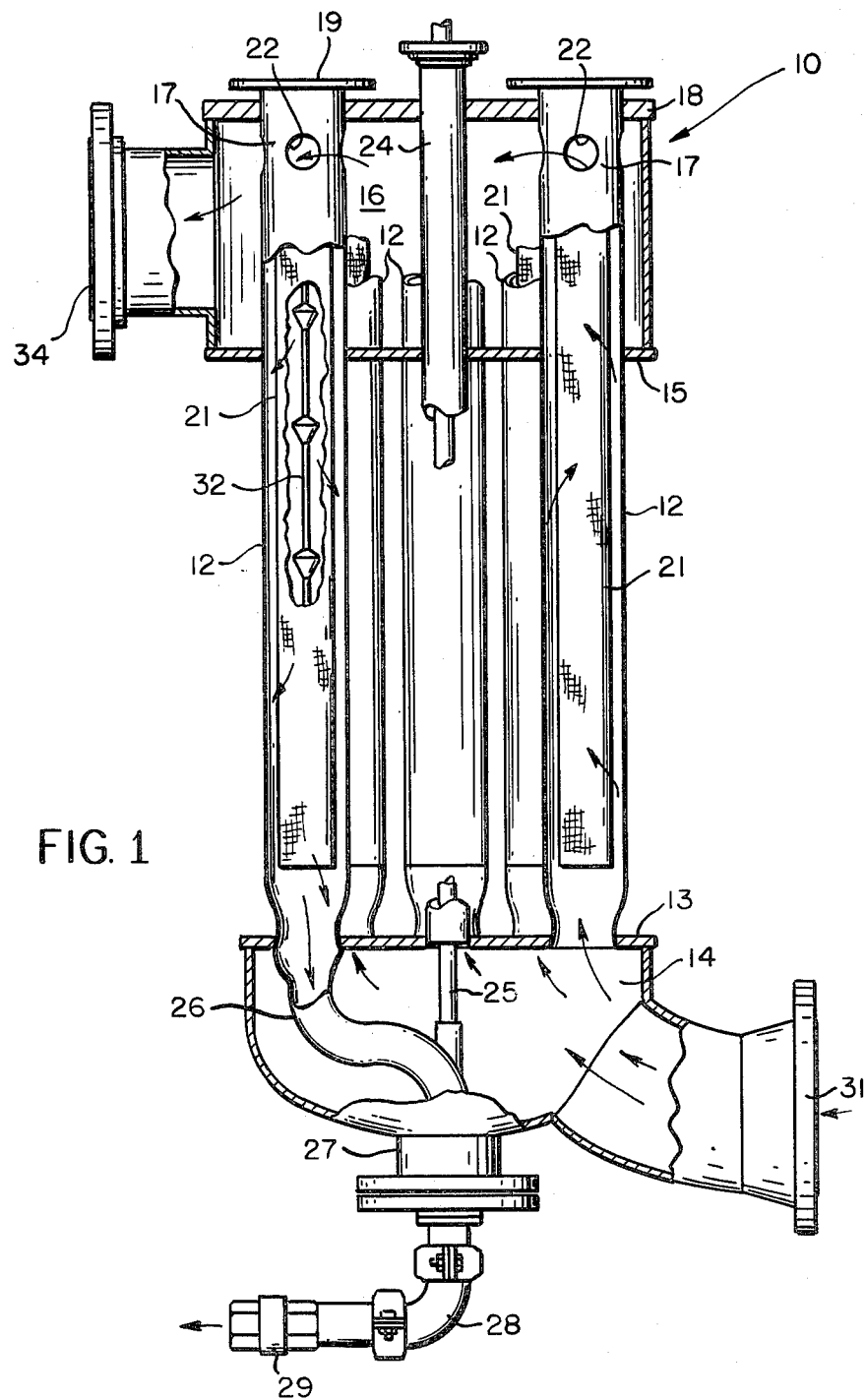
FIG. 1 is a fragmentary elevational view showing one type of series filter unit which is adapted to be used in conjunction with a control system of the type disclosed herein, portions of the unit being broken away and shown in section for purposes of illustration.

Referring now to the drawings by numerals of reference, and first to FIG. 1, 10 denotes generally a multitube filter unit comprising a plurality of spaced, parallel tubular filter supports 12 secured at their lower ends in a stationary plate 13 to communicate with a fluid inlet chamber 14, and projecting at their upper ends sealingly through another plate 15 and part way into a fluid outlet chamber 16. The upper ends of the supports 12 are closed off in the chamber 16 by a plurality of tubular cap members 17, the upper ends of which are secured in a top plate 18 on chamber 16 and sealed at the exterior of the chamber by removable covers 19.

Suspended from each cap 17, and projecting coaxially downwardly into the associated support 12 is an elongate, tubular filter element 21. The lower end of each element 21 is sealed, but its upper end communicates with the outlet chamber 16 through a filter outlet port 22 formed in the annular wall of each cap member 17. Secured intermediate its ends in the plates 13, 15, and 18 to extend parallel to the filter supports 21 is the housing 24 for a backwash operating rod 25. Rod 25 extends at its lower end into the inlet chamber 14 where it is connected in known manner to an indexible, tubular backwash arm 26. The lower end of arm 26, which is mounted in the housing 27 at the bottom of chamber 14 for limited vertical and rotational movement, communicates through a pipe 28 and an automatic backwash valve 29 with a disposal sump (not illustrated) which is maintained at atmospheric pressure. Although in FIG. 1 the backwash arm 26 is illustrated in its upper, operative position relative to the leftmost filter support 12, it is to be understood that during a normal filtering operation arm 26 is in a lowered, inoperative position in which it is disengaged from the plate 13 and the supports 12 so as not to interfere with the flow of fluid into the lower ends of supports 12 as noted hereinafter.

During a normal filtering sequence the fluid to be filtered is pumped or drawn through an inlet port 31 to chamber 14, and then upwardly through the lower ends of supports 12 and into contact with the outer peripheral surfaces of the filter elements 21. The fluid then passes radially inwardly through the pores in the filter elements, and then upwardly past conventional diffuser elements 32, which are located in the bores of the elements, and then through the outlet ports 22 into the outlet chamber 16. From chamber 16 the now-filtered fluid passes through an outlet port 34 to the machinery or other mechanism which is to be supplied with the filtered fluid.

This normal filter sequence continues until the hereinafter described control system detects that the differential pressure across the inlet and outlet ports 31 and 34, respectively, has exceeded a predetermined, preset value, at which time the operating rod 25 will function, in a manner which forms no part of this invention, to elevate the backwash arm 26 into an upper, operative position (such as shown for example in FIG. 1) wherein it connects the lower end of the leftmost filter support 12 with the outlet pipe 28 and the backwash valve 29. At this time also the valve 29 is automatically opened for a predetermined interval, (for example 3 to 4 seconds) thus placing the lower end of this support 12 at atmospheric pressure.

Assuming at this time that fluid continues to enter the lower ends of the remaining tubes 12 at approximately 50 p.s.i., and assuming also that the pressure differential which triggered the backwash operation was 10 p.s.i., then the pressure in chamber 16 at this time will be approximately 40 p.s.i. (gauge), so that there will be a sudden reverse flow of fluid through the outlet port 22 in the upper end of the leftmost cap 17 and downwardly and radially outwardly through the leftmost filter element 21, thereby causing a sudden discharge of sediment or debris from the outside surface of this filter element 21. This debris is washed downwardly by the now-reverse-flowing fluid out of the bottom end of the associated tubular support 12 and through the backwash arm 26 to the sump (not illustrated).

At the end of this particular backwash interval, the valve 29 is momentarily closed and the arm 26 is indexed into engagement with the lower end of the next successive tubular support 12, after which the backwash operation is effected in connection with the filter element 21 enclosed within this second tubular support 12. In a similar manner the remaining filter elements are backwashed by successive indexing operations of the arm 26 until all elements 21 have been cleaned, after which the backwashing cycle has been completed until such time that it is once again triggered by a predetermined differential pressure across the unit 10.

In the system hereinafter described it is to be understood that the base curve refers to a theroretical filtering sequence, or the filtering interval commencing with the introduction of a new or perfectly clean filter unit 10 into the filtering system, and terminating with the time when the unit 10 is first subjected to an initial backwash operation. Since the characteristics of this operation (for example the pressure differential across the filter unit vs. time) will be essentially the same for each new filter unit of this type, it is possible to establish a standard or base curve which will be true for any such new units. Actual filtering sequences refer to those sequences which occur between backwash cycles—i.e., after the termination of a backwash cycle and up until the next successive backwash cycle commences. One such BASE curve is denoted by the solid line in FIG. 2, while the differential pressure vs. time curve for a subsequent filter sequence is denoted in FIG. 2 by the broken lines at SEQ.

Figure 3:
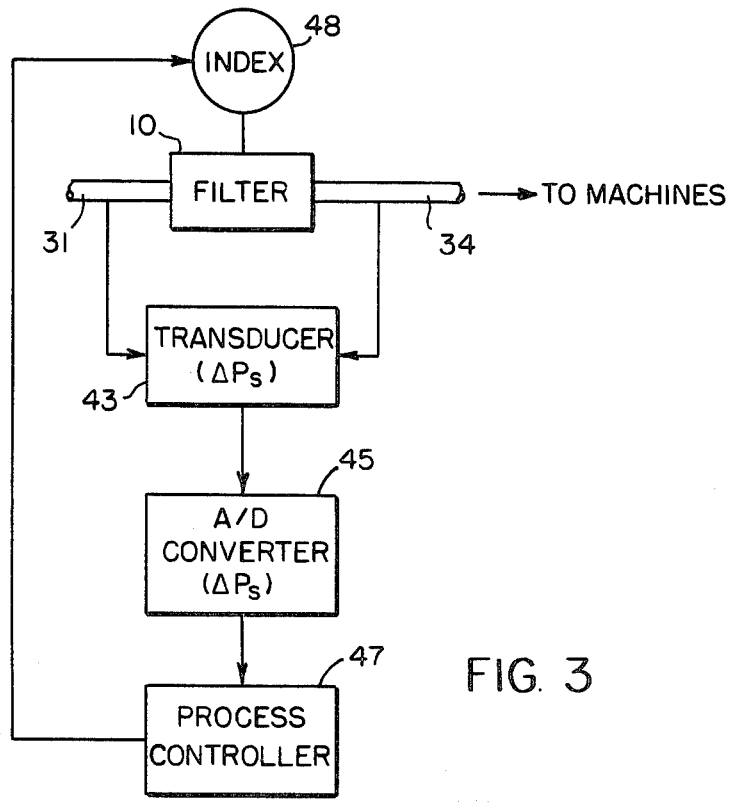
FIG. 3 is a block diagram illustrating diagramatically and generally the manner in which a system filter unit is adapted to be controlled in accordance with one embodiment of this invention.

Referring now to FIG. 3, the filter unit 10 is shown to be connected in a pipe line 31 which supplies a filtered fluid, for example a filtered coolant, to a plurality of machines or the like. The pressure differential across filter 10 is sensed by differential pressure transducer 43, which may be of the type sold by Taylor Instrument Company as an electronic differential pressure transmitter model 3404 TD21111-01. The output of transducer 43 comprises an analog signal that is proportinal to the pressure drop across the filter unit 10. This signal, which is on the order of 4 to 20 ma., is applied to an analog-to-digital converter unit 45, which may be of the type sold by International Microtronics Corporation as Model 607-2-0-4. This unit converts the incoming analog signal to digital signals (parallel 3 or 4 digit BCD) which are fed separately to a central process controller 47. This controller, which may be of the type known as Gould-Modicon C484-264, generates a set of signals for controlling the index drive for the backwash operating rod 25.

In connection with the hereinafter described control logic, it will be assumed that the controlling base curve will be similar to that shown by the solid line curve in FIG. 2, whereby at least for the first filtering sequence the controller 47 will be set to trigger the index drive 48 for the filter unit when the differential pressure thereacross equals 10 p.s.i.

Figure 4:
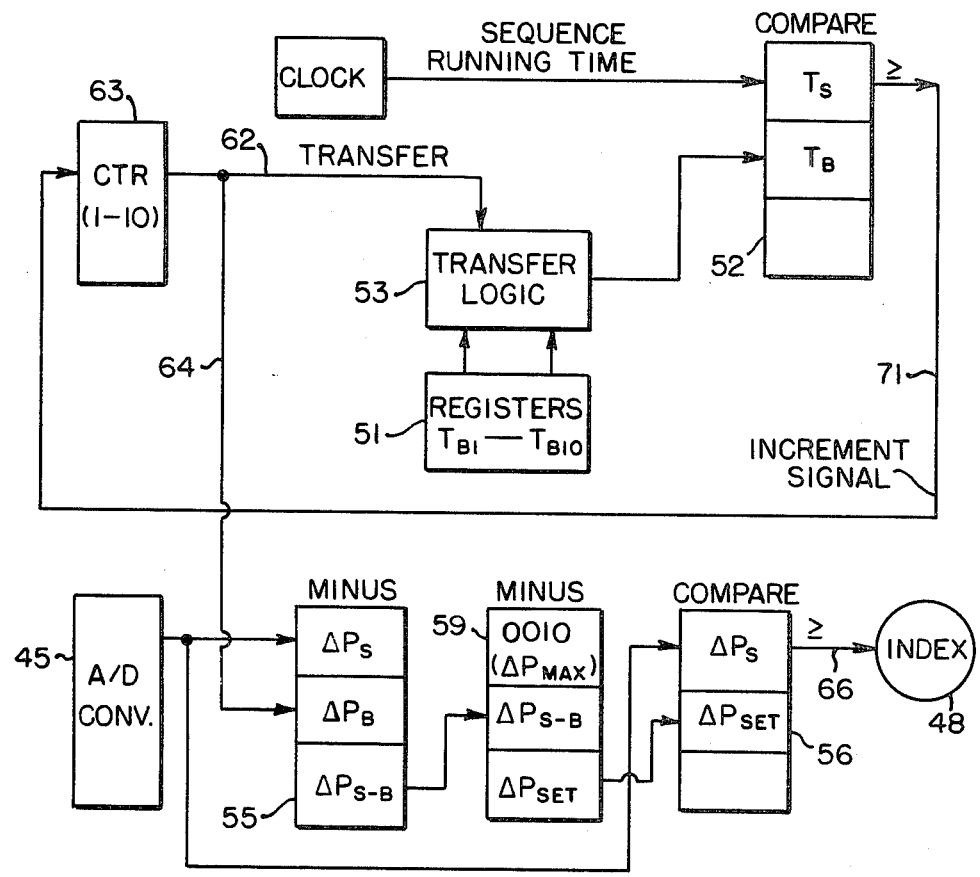
FIG. 4 is a logic diagram illustrating in greater detail the control system in FIG. 3.

Referring now to FIG. 4, the process controller 47 includes ten separate registers $T_{B1}$ through $T_{B10}$, which are denoted generally by numeral 51. Stored in each of these registers in digital form is the time that it takes for the pressure drop across a theoretical filter unit of the type represented by the base curve of FIG. 2 to reach incremental pressure differentials of 1 p.s., 2 p.s.i., 3 p.s.i, etc. through 10 p.s.i. Register $T_{B1}$, for example, represents the amount of time that it should take the filter unit 10, starting out perfectly new and clean, to reach a stage at which it would have thereacross a differential pressure of 1 p.s.i. Register $T_{B2}$ represents the amount of time it should take to raise this differential pressure from the start to 2 p.s.i. Correspondingly, each successive register through register $T_{B10}$ contains the amount of time, in digital form, it should take to increase the pressure drop across the unit effectively by 1 p.s.i. until the maximum or preset differential pressure of 10 p.s.i. is reached, at which time it would be desired to initiate the backwash operation. Registers $T_{B1}$ through $T_{B10}$ thus represent in ten successive stages the anticipated overall time for the pressure drop across an ideal filter to reach 10 p.s.i.

Controller 47 includes also a running time register $T_S$, which for purposes of illustration in FIG. 4 is shown to form part of a compare unit 52, and a one to ten counter 63, which is incremented by signals from the compare unit 52. The counter 63 performs the dual function of indicating the ten base curve differential pressure increments of 1 p.s.i. through 10 p.s.i., respectively, and also functions to transfer the contents of registers $T_{B1}$ through $T_{B10}$ one by one via logic 53 to a register $T_B$, which also forms part of the compare unit 52.

Figure 2:
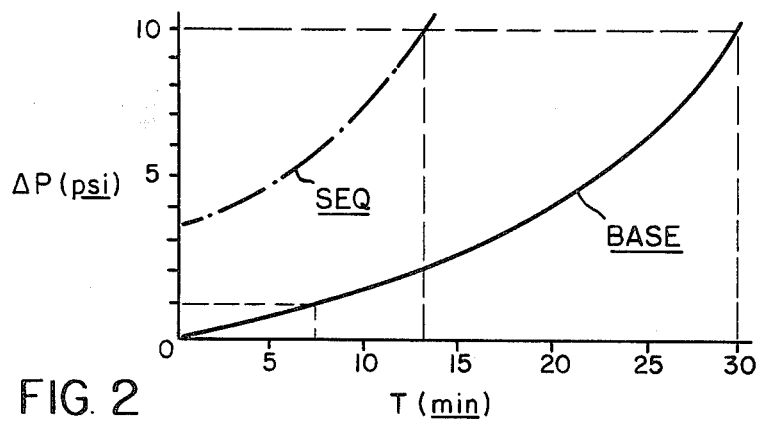
FIG. 2 illustrates graphically two filter pressure differential vs. time curves for a typical filter unit of the type shown in FIG. 1 one curve (BASE) representing the filtering characteristics of the filter when new or perfectly clean, and the other (SEQ) representing these characteristics after prolonged use of the filter.

The output of the converter 45, which represents the differential pressure across filter unit 10 during each actual filtering sequence (such as for example the filtering sequence denoted by broken lines in FIG. 2), is fed to a register $\Delta P_S$, which for purposes of illustration in FIG. 4 is shown to form part of each of a minus or subtract unit 55, and a compare unit 56. A further register $\Delta P_{MAX}$ is shown in FIG. 4 as being a part of another minus or subtract unit 59.

At the start of a filtering operation, and assuming that unit 10 has been introduced as a new or clean filter in the filtering system, the process controller 47 sets registers $T_S$ and $\Delta P_S$ and counter 63 to one (1). Register $\Delta P_{MAX}$ is preset at this time, if not previously set, to a value of ten (10). This register represents the preset maximum differential pressure of 10 p.s.i. for which the base curve has been set to initiate backwash, and therefore its contents remains the same throughout all of the filtering sequences for unit 10 as described herein.

Simultaneously with the setting of these registers controller 47 begins to apply signals by a clock mechanism 61 to register $T_S$ to record the running time of the filtering sequence then taking place through unit 10. When the contents of counter 63 is set to one, its output applies a transfer signal on line 62 to the transfer logic 53, which therefore loads the contents of the first base curve storage register $T_{B1}$ via a table-to-register move into register $T_B$ of the compare unit 52. From the beginning of the automatic operation of the filter control device, therefore, the running time of the actual filtering sequence then taking place is compared with the particular base curve time (at the outset $T_{B1}$) then contained in register $T_B$.

Also at the beginning of the filter operation the contents of counter 63, which at this time is one (1), is stored by line 64 in the minus unit 55, where it is continuously compared during this filtering sequence with the actual filter pressure differential, which is applied by the converter 45 to register $\Delta P_S$. The difference between registers $\Delta P_S$ and $\Delta P_B$ (i.e. $\Delta P_S - \Delta P_B$) is stored in the register $\Delta P_{S-B}$ which also forms part of the minus unit 55. The contents of register $\Delta P_{S-B}$ is, in turn, entered in the minus unit 59, where it is subtracted from the fixed contents (10) of register $\Delta P_{MAX}$. The difference between these two registers, which in essence is the equivalent of 10 p.s.i. - ($\Delta P_S - \Delta P_B$), is stored in the register $\Delta P_{SET}$ in unit 59. The contents of this register is also stored in the compare unit 56, where it is compared with the contents of register $\Delta P_S$. Unit 56 is such that whenever the contents of register $\Delta P_S$ equals or exceeds the contents of register $\Delta P_{SET}$, a signal will be applied by line 66 to activate the index drive 48 in order to initiate a backwashing cycle of the filter unit 10.

Referring again to the compare unit 52, and assuming for purposes of discussion that the filter unit 10 has just been placed in operation and for its first filtering sequence will exhibit the characteristics of the base curve (BASE) as shown in FIG. 2, it will be noted that the differential pressure across the associated filter unit should reach 1 p.s.i. after the first 7.5 minutes of operation of the unit. Accordingly, when the register $\Delta P_B$ is initially set for one (1), register $T_B$, which at this point is equivalent to the contents of register $T_{B1}$, will contain the digital equivalent of 7.5 minutes. Consequently, when register $T_S$ indicates that the filter unit 10 has been in operation for a period of time equal to or greater than 7.5 minutes, the compare unit 52 will generate on line 71 an increment signal which is applied to counter 63 to cause its contents to be increased by one (1), or to an equivalent value of two (2). This incrementing of counter 63 generates a transfer signal on line 62, which causes the transfer logic 53 to shift the contents of register $T_{B2}$ into the register $T_B$ for comparison with the filter sequence running time which continues to accumulate in register $T_S$. When the contents of register $T_S$ thereafter becomes equal to or greater than the contents of register $T_B$, another increment signal is applied to line 71 to increase counter 63 to a value of three (3) and simulataneously to shift the contents of register $T_{B3}$ into $T_B$ for comparison with $T_S$. This successive shifting of registers $T_{B1}$-$T_{10}$ into unit 52 continues in this manner until the backwash operation is triggered, as noted hereinafter.

During this initial filtering sequence, each time counter 63 is incremented upwardly by the value one (1), the contents of the equivalent register in unit 55 is likewise increased and continuously compared with the differential pressure date received in register $\Delta P_S$ from converter 45. Since it is assumed that for the first sequence the data from converter 45 will conform to the BASE curve of FIG. 2, the contents of register $\Delta P_S$ will never exceed that of $\Delta P_B$, so the preset or tirggering pressure differential for the backwash cycle will remain 10 p.s.i. Consequently, when the actual drop across filter unit 10 reaches 10 p.s.i. as indicated by register $\Delta P_S$ in unit 56, a signal will appear on line 66 to actuate the index 48 to commence a backwash cycle.

Even assuming that for the initial filtering sequence that the characteristics of the filter unit 10 could be identical with the base curve as shown in FIG. 2, it is clear that for the second and successive filtering sequences the pores of the filter elements 21 will begin to plug up so that the pressure differential stored in register $\Delta P_S$ will begin to exceed the base curve differential in register $\Delta P_B$.

For example, assuming that the broken-line curve denoted at SEQ. in FIG. 2 is representative of a filtering sequence for unit 10 that occurs after the unit has been placed in operation and subjected to a number of backwash operations, it will be noted that at the time this sequence commences, the residual differential pressure drop across the unit 10 will be approximately 3.5 p.s.i. Therefore, at the commencement of this filtering sequence, when counter 63 has the contents of one (1), register $\Delta P_S$ will receive from the converter 45 an initial value of approximately 3.5 (corresponding to 3.5 p.s.i.). Register $\Delta P_{S-B}$ then contains the difference of approximately 2.5, and this value is subtracted in the minus unit 59 from the value of ten (10) in register $\Delta P_{MAX}$, resulting in the equivalent value of 7.5 in register $\Delta P_{SET}$. As a consequence, this value of 7.5 is compared in the unit 56 with the current sequence pressure contained in register $\Delta P_S$, so that when the actual differential pressure across the filter unit 10 equals or exceeds 7.5, an indexing signal will be applied on line 66 to the index unit 48. The preset triggering pressure for commencing the backwash operation has thus been lowered automatically from the original base value of 10 p.s.i. to 7.5 p.s.i.

While the automatic adjustment of the preset or triggering differential pressure for the backwash cycle has been described above in connection with only one sequence curve SEQ., it will be understood that the herein disclosed mechanism operates continuously to adjust the triggering differential pressure across unit 10. For example, assuming that for some reason during the first or second filtering sequence (i.e., when the filter unit 10 is new) the differential pressure drop across the unit reaches the value of 1 p.s.i. at a time just prior to 7.5 minutes, for example at 7 minutes, then the signal applied by the converter 45 to the register $\Delta P_S$ will increase above the value of one (1) before the contents of register $T_S$ equals or exceeds the contents of register $T_B$. Consequently, before counter 63 is incremented from one (1) to two (2), the value in register $\Delta P_S$ will exceed, at least slightly, the value represented in register $\Delta P_B$, so that there will be at least some difference stored in register $\Delta P_{S-B}$. This difference will be subtracted in the unit 59 from the ten (10) value in register $\Delta P_{MAX}$ resulting in a new preset or maximum differential pressure value in register $\Delta P_{SET}$. This value, which will now be slightly less than 10, is then compared in unit 56 with the actual differential pressure indicated in $\Delta P_S$, so that even at this early stage of operation of the apparatus the preset base curve triggering value of 10 p.s.i. has already been reduced slightly. This reduction continues, as need be, until finally the "preset" value has been lowered to a point at which it is less than the differential pressure stored in register $\Delta P_S$. Indexing of the backwash then takes place.

In each of the foregoing cases it is to be understood that, following each backwash cycle, and immediately upon commencement of the following filter sequence, the process controller 47 resets the registers $T_S$ and $\Delta P_S$ to zero, and at the same time rests counter 63 to one (1). The monitoring of the pressure drop across the filter 10 then once again takes place, as noted above, with the triggering differential pressure for the backwash cycle once again being adjusted incrementally downwardly from the maximum value of 10 p.s.i. in a manner that will be apparent from the above description.

It is to be understood that the above-noted control apparatus could, if desired, include a correction factor in the form of a multiplier for arbitrarily increasing the difference in register $\Delta P_{S-B}$ between the actual pressure drop across the filter unit during an operating sequence, and the base curve differential pressure as indicated by register $\Delta P_B$. In the above-described examples no such multiplier is employed—i.e., the correction factor is one (1); but this factor could be increased as desired in order to adjust the sensitivity of the control mechanism. For example, if the contents of register $\Delta P_{S-B}$ were to be multiplied by a factor of two (2), obviously the adjusted preset pressure as indicated by the contents of register $\Delta P_{SET}$ would drop more rapidly than would be the case were this multiplication factor to be one (1).

Figure 5:
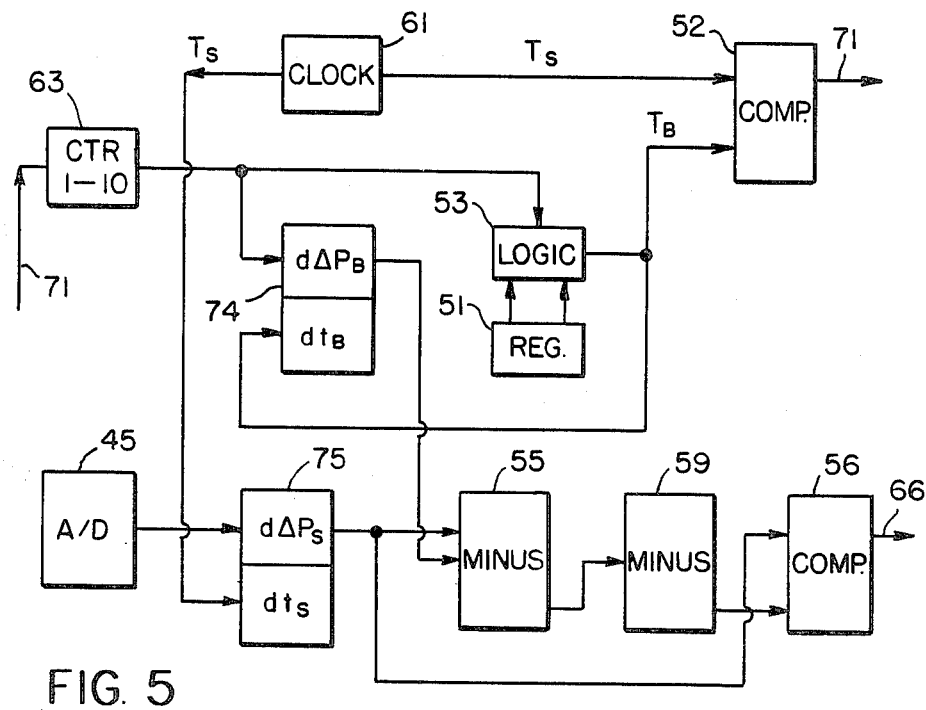
FIG. 5 is a logic diagram similar to FIG. 4 but illustrating a more refined version of this type of control means.

Instead of utilizing mathematical differences between the base curve and sequence curve coordinates, an even more refined control can be achieved by comparing the derivatives of the base curve differential with those of the actual sequence curve differentials. For example as shown in FIG. 5, 74 denotes a unit from which the derivative of the differential pressure for the base curve as a function of base curve time is fed to one input of the minus unit 55. The other input of unit 55 constitutes the output of unit 75, which produces the derivative of the sequence differential pressure ($\Delta P_S$) generated by the converter 45 as a function of the running time $T_S$. The output of unit 74 is substracted from the output of unit 75 in the minus unit 55, the output of which reduces the 10 p.s.i. base curve preset or triggering pressure in unit 59 in a manner similar to that described above. The difference is compared in unit 56 with the output of unit 75, and if exceeded by the latter an index signal appears on line 66 to effect a backwashing cycle as noted above.

In the preferred embodiment of the invention (FIGS. 6 and 7) wherein like numerals are employed to denote elements similar to those employed in the first embodiment, the control means is designed to reduce the preset or triggering pressure for a backwash operation in accordance with the time differential which separates the base curve from the sequence curve at any given instant, and at a rate which is inversely proportional to the rate of clogging indicated by the base curve. In other words, each adjustment of the preset or triggering pressure is effected, in essence, by measuring along the base curve rearwardly from its maximum time and pressure coordinates, rather than forwardly from its minimum time and pressure coordinates. The result is that, even for rather modest time differentials developed between the curves during initial stages of a filtering sequence, the corresponding reduction from the preset or triggering pressure will be rather large, since the slope of the base curve is far greater adjacent its maximum coordinates than adjacent its minimum coordinates.

Figure 6:
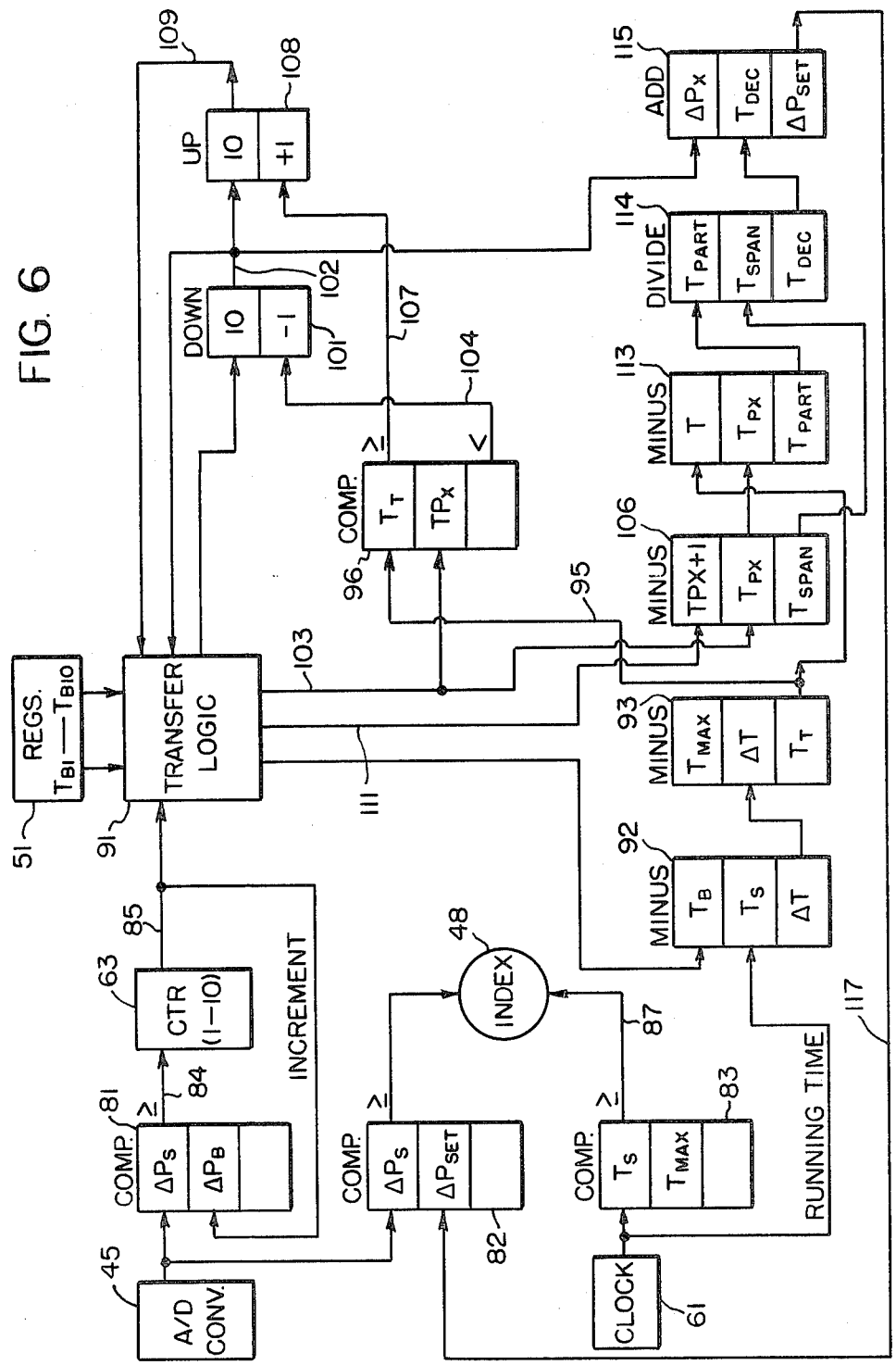
FIG. 6 is a logic diagram showing a preferred form of the control means which is made in accordance with a second embodiment of this invention.

In this preferred embodiment, the differential base pressure is again respresented by a decade counter 63 (FIG. 6) in increments of 1 through 10 corresponding to 1 p.s.i., 2 p.s.i., 3 p.s.i, etc. Likewise, the respective times which it takes the base curve to reach the differential pressure increments of 1 p.s.i, 2 p.s.i, etc., are stored in ten different registers $T_{B1}$-$T_{B10}$ denoted generally in FIG. 6 by the numeral 51. Also as shown in FIG. 6, the output of converter 45 applies the digital value of the actual differential pressure across the filter 10 during a sequence to a register $\Delta P_S$, which forms part of a compare unit 81. This unit includes a second register $\Delta P_B$, the contents of which is supplied by the output of the counter 63, which may be similar to that employed in the first embodiment. Another compare unit 82 contains a first register which is also supplied with the sequence differential pressure $\Delta P_S$, and a second register which contains, as noted hereinafter, the adjusted preset differential pressure $\Delta P_{SET}$. Still another compare unit 83 includes a register which receives clock signals from the clock 61 indicating the running time $T_S$, and a second register which contains in a digital format the maximum time $T_{MAX}$ which it takes the BASE curve (FIG. 7) to reach its maximum preset value, which as in the first embodiment will be assumed to be 10 p.s.i.

Whenever during the operation of this control means the contents of the register $\Delta P_S$ in the compare unit 81 equals or exceeds in value the contents of the unit's other register $\Delta P_B$, an incrementing signal is applied on line 84 to the input of the counter 63, thus increasing the contents of the counter by one, and at the same time increasing the contents of the register $\Delta P_B$ in the unit 81 by one. As noted hereinafter, each time this occurs the preset or maximum differential pressure $\Delta P_{SET}$, which is stored in compare unit 82, is examined and adjusted if necessary. Moreover, whenever the contents of the register $\Delta P_S$ in the unit 82 equals or exceeds the value of $\Delta P_{SET}$ stored in the other register, the unit 82 applies a signal on line 86 to the index mechanism 48 to effect a backwashing of the filter unit 10.

Also as illustrated in FIG. 6, whenever the overall elapsed running time of the filtering sequence, as indicated by the contents of register $T_S$ in the unit 83, exceeds the value stored in register $T_{MAX}$ in the unit, a signal is applied on line 85 by unit 83 in order to energize the indexing unit 48 to effect the backwashing cycle.

Each time the counter 63 applies an incrementing signal on line 85 to the $\Delta P_B$ register, it also applies a transfer signal to the transfer logic 91 (FIG. 6), thereby causing the contents of the registers $T_{B1}$-$T_{B10}$ to be transferred successively one-by-one to a register $T_B$, which forms part of a minus or subtract unit 92. Unit 92 also contains a second register $T_S$ which accumulates in digital form the running time of the filter unit as indicated by the output of clock 61. Each time an incrementing signal on line 85 causes the contents of one of the registers $T_{B1}$-$T_{B10}$ to be transferred to the compare unit 92, the contents of the register $T_S$ in this unit is subtracted from the contents of register $T_B$, and the difference is stored in a third register $\Delta T$, which also forms part of unit 92.

Figure 7:
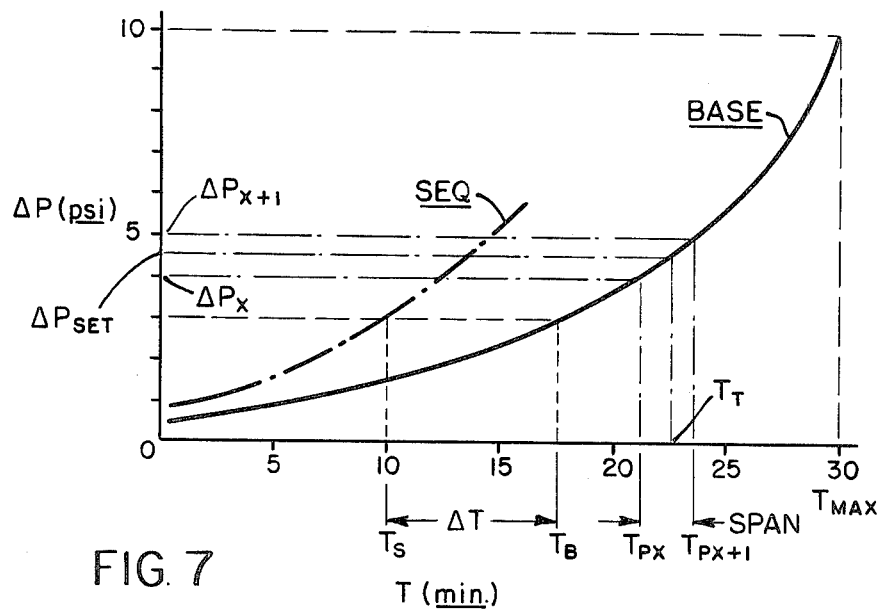
FIG. 7 is a graphical illustration of base and sequence curves generally similar to those shown in FIG. 3, and illustrating coordinates that are important to an understanding of this second embodiment.

By way of example, and referring to FIG. 7, it will be assumed that an increment signal has just raised the contents of register $\Delta P_B$ to three (3), or the equivalent of the differential pressure of 3 p.s.i.. According to the base curve shown in FIG. 7, this theoretically should have taken approximately seventeen and one half minutes, (see $T_B$, in FIG. 7) but as indicated by the broken lines in FIG. 7 where 3 p.s.i. intersects the sequence curve SEQ., it has only taken approximately ten minutes ($T_S$ in FIG. 7). The difference between the time it should have taken and the time that it actually took constitutes the above-noted time differential $\Delta T$, which is stored in the minus unit 92, and which for the example as shown in FIG. 7 amounts to approximately seven and one half minutes. This time differential is employed in accordance with the teachings of this invention to adjust the preset pressure of the unit by then subtracting this difference $\Delta T$ from the overall maximum time ($T_{MAX}$) that it should take the base curve to reach its original, preset value of 10 p.s.i., which for the example shown in FIG. 7 would be approximately 30 minutes. The time represented by this difference, which is referred to hereinafter as the target time $T_T$, (approximately 22½ minutes in FIG. 7) is used to determine from the BASE curve the new or revised preset differential pressure ($\Delta P_{SET}$): or in other words, the point on the base curve intersected by a vertical line through the time coordinate $T_T$ as shown in FIG. 7.

To determine the digital value of $T_T$, the value $T_{MAX}$ (10 for 10 p.s.i.) is stored in a minus unit 93 (FIG. 6) which receives in a second register the value of $\Delta T$ and subtracts it from $T_{MAX}$. The resultant value $T_T$ is stored in a third register ($T_T$) in the unit 93, and is entered also by a line 95 in a similarly designated register $T_T$ which forms part of a compare unit 96. As previously noted, each of the ten registers 51 contains the amount of time it ideally should take the filter unit differential pressure to reach each of the ten incremental pressures of 1 p.s.i., 2 p.s.i., 3 p.s.i., etc. Consequently, by determining which of these two registers 51 bracket the target time $T_T$, it is then possible also to determine the two corresponding differential base pressure increments between which the adjusted preset pressure will lie.

To determine the lower end of this time bracket, which in FIG. 7 is denoted as $T_{PX}$, a decade down counter or register 101 is actuated at this time by a signal from the transfer logic 91. Counter 101 develops a transfer signal at its output 102, which is applied to the transfer logic 91 to cause registers $T_{B1}$ to $T_{B10}$ to be transferred in inverse order, and one-by-one on line 103 to a second register $T_{PX}$ in the compare unit 96, and to a similar register $T_{PX}$ which forms part of another minus unit 106. As each of the registers 51 enters the compare unit 96, if the contents of $T_{PX}$ is less than that of register $T_T$, a signal from the unit 96 is applied on line 104 to the down counter 101, once again to develop on its output 102 another transfer signal, so that the next lower register 51 is entered by line 103 into units 96 and 106. When the contents of one of the registers 51 finally falls below the value of the target time contained in register $T_T$ of unit 96, a signal is applied on line 107 at the output of unit 96 to the input of a decade up counter 108, which then generates on its output 109 a signal to the transfer logic 91, which causes the contents of the next highest of registers $T_{B1}$-$T_{B10}$ (i.e., the one next above the one indicated by the contents of register $T_{PX}$) to be transferred on a line 111 to another register $T_{PX+1}$ in the minus unit 106. At this stage, therefore, unit 106 contains the contents of the two base curve registers 51 which in value are immediately above and immediately below the value of the target time $T_T$. The purpose of register 106 is to determine the difference between the contents of the two, bracketing base curve registers $T_{PX}+1$ and $T_{PX}$. This difference is stored in the register denoted $T_{SPAN}$, which also forms part of the minus unit 106.

As shown in FIG. 7, the target time $T_T$ now lies part way between opposite ends of the time intervals denoted at SPAN, and the extent to which target time $T_T$ exceeds the time $T_{PX}$ can be determined by subtracting the time $T_{PX}$ from target time $T_T$ and dividing the remainder by the SPAN time. Referring to FIG. 6, this is done by using another minus unit 113, which in one register contains the value of the target time $T_T$ and in another the value of the lower bracket time $T_{PX}$, which is therefore subtracted from $T_T$ with the difference being stored in a register in unit 113 denoted as $T_{PART}$. The contents of this register is entered in a similar register in a divide unit 114, which contains in another register the time value denoted $T_{SPAN}$, which corresponds to the time identified in FIG. 7 as SPAN. Since the time value $T_{PART}$ is less than the time value $T_{SPAN}$, the resulting value will be a decimal value which is stored in a third register $T_{DEC}$ in unit 114. This decimal value is in digital form and is no longer an exact measure of time, but is now an indication of the ratio or extent to which the target time $T_T$ exceeds the lower time bracketing point $T_{PX}$, based upon the SPAN interval.

From FIG. 7 it will be apparent that the SPAN time coodinates of the BASE curve have corresponding $\Delta P$ coordinates which fall between two successive pressure increments, in this case 4 p.s.i. and 5 p.s.i., or $\Delta P_X$ and $\Delta P_{X+1}$, respectively. Consequently the extent to which $T_T$ exceeds $T_{PX}$, as denoted by $T_{DEC}$, will be the same as the extent to which the differential pressure $\Delta P_{SET}$ exceeds the differential pressure $\Delta P_X$. Because of this relationship it is possible to determine the $\Delta P_{SET}$ value simply by adding the decimal value of $T_{DEC}$ to the differential pressure $\Delta P_X$.

Referring to FIG. 6, the contents of the count down register 101 is at this stage equal to the value of the incremental base pressure which corresponds to the time then stored in register $T_{PX}$ of the minus unit 106. In the example shown in FIG. 7 this particular value would amount to 4 p.s.i., which is denoted at $\Delta P_X$. Accordingly the contents of the down counter register 101 is applied to a register $\Delta P_X$ which forms part of an add unit 115. When the decimal value $T_{DEC}$ is developed in the divide unit 114 it is entered in a register $T_{DEC}$ of unit 115, and the sum is recorded in another register $P_{SET}$ in unit 115. (In the example illustrated in FIG. 7 $P_{SET}$ would equal the decimal value of something over 4 and under 5.) This adjusted value of the preset differential pressure is then applied by line 117 to the $\Delta P_{SET}$ register which forms part of the compare unit 82. As previously noted, whenever the contents of the register $\Delta P_S$ in this unit equals or exceeds the contents of the register $\Delta P_{SET}$, the indexing device 48 will be energized to effect a backwashing operation.

From the foregoing it will be apparent that the present invention provides extremely reliable and accurate means for maintaining as clean as possible the filter in systems of the type described. Instead of utilizing a single, preset differential pressure value for triggering the backwashing cycle, the apparatus continuously monitors the pressure drop across the associated filter unit and automatically adjusts the pressure at which backwash will occur.

A principal advantage of this system is that the backwash cycle is substantially improved, thereby prolonging the life and effective operation of the associated filter. The amount of plugging of the pores of such filters is a function of several factors, including the pressure at which the chips or debris are impinged upon the filter septum. By reducing the set point at which the backwash occurs, this impinging pressure is reduced. Likewise, the backflush pressure is increased, and the ratio of the backflush pressure to the applied pressure is also increased.

By way of example, if the preset pressure is 10 p.s.i., and the input pressure of the filter is 50 p.s.i., then the pressure in the outlet chamber 16 (FIG. 1), which contains the clean or filtered fluid, is 40 p.s.i. When the 10 p.s.i. backflush set point is reached, 40 p.s.i. will be exerted upon the reverse side of the tube 21, or from the inside toward the outside thereof as shown by the left hand tube 21 in FIG. 1. At this stage, therefore, the ratio of backflush pressure to the applied or impinging pressure is 4 to 1.

However, when the set point is reduced from 10 p.s.i. to 5 p.s.i., then the backflush pressure which would be exerted on the reverse side (inside) of the tube in question will be 45 p.s.i. The adjusted set point pressure, therefore, results in a ratio of backflush pressure to applied pressure of 9 to 1. This ratio increases as the preset value is reduced, and is indicative of the corresponding increase in the backflush pressure which is applied to a tube, such as tube 21, during its cleaning cycle.

The result of such a construction is that the effect of sudden changes in the conditions of the filtering system can be reduced. Factors such as flow rate of the fluid in the system, the nature of the debris being filtered, the nature of the liquid being filtered, etc., can all change or alter suddenly subsequent to the start-up of the filtering sequences. The changes may be intermittent, or they could be continuing. In either case they result in a sequence curve which will be different from that of the base curve relationship. In all instances where these changes cause the pressure differential to increase more rapidly than the base curve differential, the setpoint will be reduced, and the frequency of backwashing will be increased. The more frequent the backwashing the faster the cycling through the "abnormal" conditions. The result is a system which prolongs or improves the life of the associated filter.

An advantage of employing the preferred embodiment of this invention (FIGS. 6 and 7) is that the reduction or adjustment of the preset, backwash-triggering pressure is more drastic in the early stages of a filter sequence than is the case when control means of the type disclosed in the first embodiment is employed. On the other hand, the apparatus of the first embodiment has the advantage that the adjustment can be made substantially continuously during a filtering sequence rather than intermittently (i.e., upon change of incremental pressures 1 p.s.i., 2 p.s.i., etc.) as required by the preferred embodiment. However, even those intermittent adjustments can be increased simply by reducing the size of the pressure increments $\Delta P_B$.

While the invention has been described in connection with the storage of an empirically derived base curve for a filter, it will be apparent that this base curve could be the actual rate of change of differential pressure across a particular filter during its initial filtering sequence (i.e, when the filter is new), in which case each filter would be compared with its own distinctive base curve, rather than a base curve assumed to be common for a type of filter. And although in the emobidiment illustrated the filter unit 10 has been shown to comprise a plurality of tubular filter elements, it will be apparent that this type of filter unit has been illustrated merely by way of example and it will be readily apparent that other types of filters can be employed without departing from this invention.

Also, while the invention has been illustrated and described in detail in connection with only certain embodiments thereof, it will be apparent that it is capable of still further modification, and that this application is intended to cover any such modifications as may fall within the scope of one skilled in the art, or the appended claims.

What we claim is:

1. A method of improving the filtering of fluids in a system of the type having a filter connected in a system line to filter fluid flowing through the line, comprising the steps of monitoring differential fluid pressure across said filter, automatically and intermittently cleaning said filter each time a value of said differential pressure thereacross reaches a preset value, and automatically adjusting said preset value during intervals between said cleaning steps each time the value of said differential pressure across said filter for a given instant in one of said intervals differs from that for the corresponding instant in the preceding interval.

2. A method as defined in claim 1, including comparing an actual rate of increase in the differential pressure across said filter at any instant with a predetermined rate of increase in said differential pressure, and reducing said preset value of said differential pressure when said actual rate of increase exceeds said predetermined rate.

3. A method as defined in claim 2, including reducing said preset value of said pressure differential in accordance with a rate inversely proportional to said predetermined rate.

4. A method as defined in claim 2, including reducing said preset value each time the value of the differential pressure across said filter increases a predetermined amount during said one interval.

5. A method as defined in claim 4, including determining, for each interval that said differential pressure increases said predetermined amount, a time differential between a time it took the pressure to increase said predetermined amount and a time it should have taken as indicated by said predetermined rate, and reducing said preset value of differential pressure to an adjusted value equal to the differential pressure which according to said predetermined rate exists after operation of the filter in said system line for a period of time equal to a time it takes to reach a predetermined maximum differential pressure, minus said time differential.

6. A method as defined in claim 1, including comparing a derivative of the actual rate of change of said differential pressure across said filter with a derivative of a predetermined rate of change of said differential pressure thereacross, and reducing said preset value when the derivative of said actual rate exceeds the derivative of said predetermined rate.

7. A method as defined in claim 2, including continuously comparing said rates and reducing said preset value during each of said intervals, whereby the adjustment of said preset value is effected substantially continuously during each of said intervals.

8. A method as defined in claim 7, including comparing a time it takes for the differential pressure across said filter to reach said preset value with a length of time it takes to reach a maximum preset value in accordance with said predetermined rate, comparing the actual differential pressure across the filter with the differential pressure that should exist thereacross at predetermined times according to said predetermined rate, and reducing said preset value of said differential pressure by a difference between the differential pressure that should exist across said filter according to said predetermined rate and that which actually exists across said filter.

9. Backwash control apparatus for a pressurized system of the type in which a filter is connected in a system line to filter fluid flowing through the line, comprising means for continuously monitoring and determining a value of differential fluid pressure across said filter, means for automatically and intermittently cleaning said filter each time said actual differential pressure thereacross equals or exceeds a preset value, means for comparing during intervals between each cleaning of said filter an actual rate at which said differential pressure increases toward said preset value with a predetermined base rate at which it theoretically should increase, and means for adjusting said preset value each time said actual rate differs from said predetermined base rate.

10. Backwash control apparatus as defined in claim 9, including means for recording a time it should take said differential pressure to reach a maximum value according to said base rate, said comparing means including means for comparing an actual time it takes said differential pressure to reach each of a plurality of different pressure differentials with the time it should take according to said predetermined rate, and said adjusting means including means for lowering said preset value each time one of said different pressure differentials is reached in less time than the time it should have taken in accordance with said predetermined base rate.

11. Backwash control apparatus as defined in claim 10, including means for recording the value of said maximum differential pressure, and said lowering means including means for reducing said preset value to a value equal to said maximum differential pressure less a difference between said actual differential pressure at any instant and the differential pressure that should exist at that instant according to said predetermined base rate.

12. Backwash control apparatus as defined in claim 11, wherein said maximum differential pressure is stored in digital form in a first register, the actual differential pressure across the filter is entered in digital form in a second register, said different pressure differentials are intermittently entered one-by-one and in digital form in a third register, and the difference between said second and third registers is substracted from the contents of said first register to produce said preset value.

13. Backwash control apparatus as defined in claim 10, including means operative each time the actual differential pressure reaches one of said different pressure differentials to determine a time differential between the time it actually took and the time it should have taken, and said lowering means including means for lowering said preset value to a value that the differential pressure would be, according to said base rate, at a target time equal to the time it would take to reach said maximum differential pressure less said time differential.

14. Backwash control apparatus as defined in claim 13, including means for determining values of said different pressure differentials immediately greater than, and immediately lesser than, respectively, said one of said different pressure, means for determining a decimal value of differential ratio, of a difference between the target time and the time it should take according to the base rate to reach said immediately lesser value, to the difference between the time it should take according to said base rate to reach said greater value and said lesser value, and means for adding said decimal value to said lesser differential pressure value to establish said preset value.

15. A method of controlling the cyclical operation of a backwashing mechanism for a filter, comprising monitoring an actual rate at which a differential fluid pressure develops across the filter during the filtering sequences between backwashing operations, comparing said actual rate with a predetermined rate based upon a theoretical rate of increase, in said differential fluid pressure during one of said filtering sequences, presetting said backwash mechanism automatically to be operated each time the actual differential pressure across said filter reaches a preset maximum value, and automatically adjusting said preset value whenever said actual rate differs from said predetermined rate.

16. A method as defined in claim 15, wherein said preset value is adjusted at a rate inversely proportional to said predetermined rate, when said actual rate differs from said predetermined rate.

17. A method as defined in claim 15, including
intermittently determining a time differential between a time it actually takes said differential pressure to reach a given value, and a time it would take in accordance with said predetermined rate,
subtracting said time differential from an overall length of time it would take to reach a maximum differential pressure in accordance with said predetermined rate, and
adjusting said preset value to the differential pressure which would exist, according to said predetermined rate, at the time corresponding to the difference between said time differential and said overall time.

18. A method as defined in claim 15, including
recording a value of the maximum pressure at which backwash would occur in accordance with said predetermined rate,
determining the difference between the actual differential pressure across the filter at any instant during each filtering sequence with the differential pressure which would exist at that instant according to said predetermined rate, and
subtracting the last-named difference from said maximum pressure to determined said preset value.

19. A method as defined in claim 15, including
storing said predetermined rate in a digital format,
recording said actual rate in a digital format,
continuously comparing said stored rate with the recorded rate during each filtering sequence, and
adjusting said preset value during each filtering sequence whenever the digital value of said actual rate at any instant differs from the digital value of said predetermined rate for the corresponding instant.

20. A method as defined in claim 19, including comparing a derivative of said actual rate at which the fluid pressure differential develops across said filter with a derivative of said predetermined rate of change in said differential pressure.

* * * * *